Patented Oct. 1, 1935

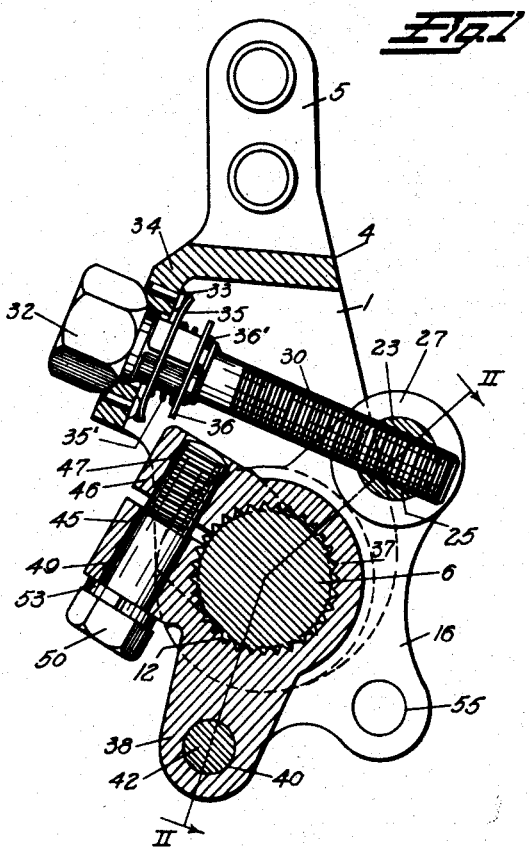
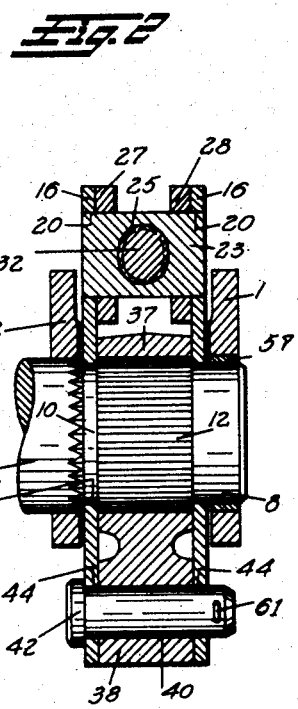
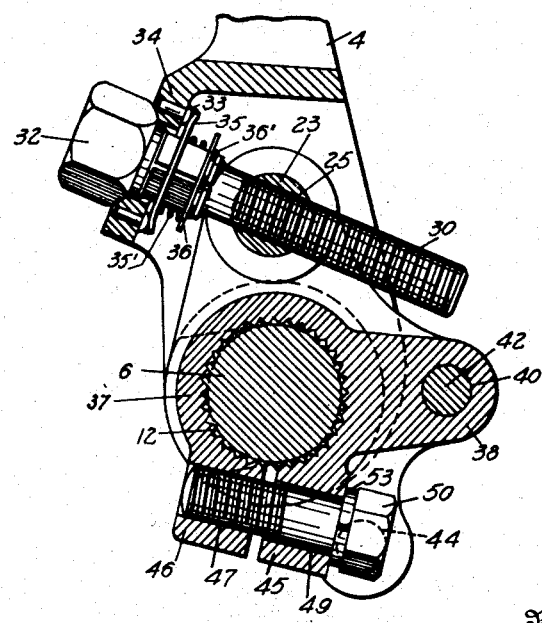
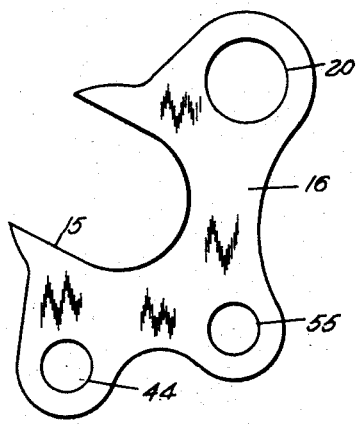

2,015,881

UNITED STATES PATENT OFFICE 2,015,881

SLACK ADJUSTING MECHANISM

Herbert W. Alden and Laurence R. Buckendale, Detroit, Mich., assignors to The Timken-Detroit Axle Company, Detroit, Mich., a corporation of Ohio Application December 27, 1933, Serial No. 704,182

9 Claims. (Cl. 188—196)

This invention relates to a mechanism wherein two members are relatively adjustable for the purpose of taking up play or compensating for wear. More specifically the present invention is concerned with slack-adjusting mechanisms for association with operable parts of automotive vehicles, and particularly for association with brakes and the operating means therefor.

This application is an improvement over the mechanism disclosed in an application of Laurence R. Buckendale, Serial Number 687,687, filed August 31, 1933 for Slack adjuster. The operation of this last-mentioned mechanism is restricted, in angular movement for adjustment purposes, to the length of the threaded portion of an adjusting bolt. Due to the limited angular movement which can be compensated for by adjustment, the thickness of the wearing material (such as brake lining on a brake shoe) is limited by the angular movement provided in the adjusting means. It has been found, for example, that with the mechanism of said earlier application, and using the ordinary type of actuating cam, the full amount of adjustment can not be obtained with linings of more than three-eights of an inch in thickness.

It is desirable upon occasion to use thicker brake linings, such as, for example, three-quarters of an inch thickness. Accordingly, it is the primary object of the present invention to provide a slack adjuster of the angularly adjustable type which will be capable of manipulation to effect a greater take-up or compensation than has heretofore been deemed possible; and more specifically, since the mechanism of the aforementioned application Serial Number 687,687 has numerous advantages and operates satisfactorily within a given angular range, it is a major object of this invention to increase the adjustment range of that particular mechanism while retaining the improvements and advantages of the latter.

Therefore, with reference to vehicle brakes, it follows that it is an object of this invention to provide a brake slack adjusted of the character above referred to that will provide for sufficient adjustment to compensate for complete wear of relatively thick brake linings.

It is a further object to provide a slack adjusted mechanism that will require only one two-handed adjustment throughout the life of the lining, the other necessary adjustments being accomplished with one hand.

It is a further object to provide a slack-adjuster mechanism having unusually great angular adjusting movement but yet requiring the least possible room axially on the shaft on which it is placed.

A preferred embodiment of the improved mechanism of this application is disclosed in the accompanying drawing, which is a part of this application and, wherein:

Figure 1 is a side elevational view in partial vertical section,

Figure 2 is a section through Figure 1 taken substantially on the line II—II,

Figure 3 is a side elevational view of the actuating plates of the invention, and Figure 4 is a view identical with Figure 1, except that the mechanism is shown in its position of maximum adjustment.

With continued reference to the drawing wherein like reference characters indicate like parts throughout the several figures, and with particular reference to Figure 2, numerals 1 and 2 indicate the legs of a yoke member generally designated by numeral 4, which is adapted to embrace all other parts and freely rotate on a supporting shaft 6. The yoke 4 has an upper extension 5 for actuating the same; and the shaft 6 is designed to be rotated, by mechanism later described, when the extension 5 is pushed or pulled in the proper direction.

The free or outer end of shaft 6 has a reduced portion 8, and spaced therefrom is a circumferential groove 10. A series of serrations 12, running parallel to the axis of the shaft and of substantially the same depth as the groove 10, is provided on the shaft between the groove and the reduced portion. The diameter of groove 10 is the same as the diameter of the reduced portion 8.

Fitting into groove 10, as permitted by a U-slot 15, is a plate member 16 for positioning the whole mechanism upon shaft 6. The shape of this plate member is fully disclosed in Figure 3. A second member 16 is fitted on the reduced portion 8 in parallelism with the first. Both of these members are freely rotatable on shaft 6. Members 16 are provided with apertures 20 through which is inserted a pin 23. Pin 23 is adapted to rotate freely within apertures 20 for a purpose which will presently appear, and is provided with threaded apertures 25 equally spaced from its ends.

Immediately adjacent members 16 and placed toward the insides thereof are washers 27 and 28 which are adapted to fit around pin 23. When the pin 23 is in its assembled relation with members 16 and washers 27 and 28 are in place, the threaded aperture 25 lies between said members and washers and is equally spaced therefrom to receive the threaded end 30 of an adjusting bolt 32. The other end of bolt 32 is suitably journaled in a bridge portion 34 of the yoke member 4.

Washers 27 and 28 are for the purpose of preventing lateral movement of pin 23 in apertures 20, and they serve as spacers which position threaded portion 30 of bolt 32 centrally between members 16, and so position pin 23 correctly. There is slight clearance provided between washers 27 and 28 and threaded portion 30 of bolt 32 so that no binding will occur.

Pin 23 is adapted to swivel in apertures 20 in members 16 in order that bolt 32 will not receive undesirable twisting forces at this point.

It may be said here that it is possible to eliminate washers 27 and 28 by bending members 16 inwardly, said bend to be only around aperture 20 so that the innermost portion of said members would coincide with the innermost portions of washers 27 and 28 as disclosed. However, the illustrated form is preferred because it requires only one set of stamping dies for making both members 16. Identity of the two parts, 16, has the further advantage of requiring stocking of but a single part.

Bolt 32 is furthermore provided with a suitable latching assembly which retains the bolt in its adjusted relation. In the present instance the latch assembly comprises a plurality of rivets 33 which are secured to bridge 34 in any suitable manner and a washer 35 which is preferably positioned upon a squared portion of bolt 32 and provided with peripheral latching formations adapted to contact rivets 33. Washer 35 is held in yielding contact with rivets 33 by means of a suitable coil spring 35' which encircles the squared portion of bolt 32 and reacts against a washer 36 which is mounted on bolt 32 and adapted to rotate therewith. A snap ring 36' maintains washer 36 against axial movement along bolt 32. Spring 35' is of sufficient strength to prevent bolt 32 from jarring or shaking loose but is not strong enough to prevent simple adjustment thereof by the fingers of one hand. For a more detailed discussion of the latching means associated with the bolt 32 reference may be had to the above mentioned copending application wherein the mechanism is described in detail.

Interposed between members 16 and complementally fitting the serrated portion of the shaft 6 is an internally serrated collar 37 having an arm 38, which at its outer extremity is centrally apertured, as at 40, to receive a clevis pin 42 which likewise is inserted through apertures 44 in members 16. This pin is maintained in position by a cotter pin 61. At approximately 90° to arm 38 the collar 37 is slit to form ears 45 and 46. The ear 46 has a threaded aperture 47, and the other ear, 45, has a smooth aperture 49 in alinement with the threaded aperture 47. A capscrew 50 projects freely through aperture 49 and is threaded into the ear 46 to draw the two ears together, and thereby couple the shaft 6 and the arm 38 for unitary oscillation. Lock washer 53 is provided for locking capscrew 50 in place.

It will be noted that the clamping bolt 50 does not contact the shaft and in no way positions the mechanism axially thereof. Positioning is accomplished as before mentioned, by that member 16 which cooperates with the groove 10. This is advantageous in that the full width of the serrated portion is available for torque transfer and hence may be made much smaller than usual.

Plates 16 are provided with a third aperture 55 of the same size as aperture 44 and placed between said last-mentioned aperture and aperture 20. Aperture 55 is also spaced radially from the center of plate 16 the same as aperture 44, and thus is designed to receive the pin 42 when a major adjustment is made in a manner hereafter described.

A bushing 57 is interposed between leg 1 of yoke 4 and the reduced diameter 8 of shaft 6. Said bushing 57 is press-fitted into the aperture provided therefor in leg 1, said aperture being of the same size as the corresponding aperture in leg 2. Bushing 57 has a freely rotating fit on the shaft portion 8. The insertion of this bushing in leg 1 or leg 2 makes the difference between a right-hand and left-hand slack adjuster. That is, should the adjuster be required for use on a shaft whose outermost end is under leg 2, the bushing would then be omitted from leg 1 and press-fitted into leg 2. Therefore, one of the desirable features of this design is the elimination of right-hand and left-hand parts as manufactured. The assembly of the bushing 57 is the only thing which makes a right-hand or a left-hand device. Therefore, all the parts in themselves are identical whether they are to be used for right-hand or left-hand slack adjusters.

*Operation*

With the mechanism in the position shown in Figure 1, which is the position when the brake lining is new, the adjusting bolt 32 may be rotated by hand or with a suitable tool if desired and the members 16 through the interconnection of bolt 32 and pin 23 will be moved in a counter clockwise direction due to the threaded connection between bolt 32 and pin 23. It will thus be apparent that a very fine adjustment of the angular relation of the members 16 and 1 may be obtained. In view of the fact that the members 16 are rigidly connected to the member 37 by pin 42 passing through arm 38 of member 37 and apertures 44 or 55 in members 16, the member 37 will assume the same angular position with respect to member 1 as the members 16 will take. The shaft 6 is secured to member 37 and is, therefore, caused to rotate therewith. From a consideration of the above operation it will be clear that the cam (not shown) carried by shaft 6 and adapted to spread the brake shoes will be forced to assume an angular position with respect to the cam faces provided on the brake shoes, thereby spreading them apart a definite amount depending upon the angular movement of shaft 6. This angular disposition of the brake operating cam is independent of the rotation incident to movement of member 1 due to the vehicle operator's actuation of the brake pedal. It will, therefore, be clear to one familiar with the ordinary brake operating mechanisms utilized on automotive vehicles that a very accurate and fine adjustment is provided by the bolt 32 and its associated mechanism.

The adjustments so far made are sufficient for taking up the wear incident to the use of ⅜ brake lining and may be one-hand adjustments. This manner of adjustment is followed until such time as the pin 23 travels the full length of the threaded portion 30 of bolt 32. (See Figure 4.) So far the action is in general the same as disclosed in the aforementioned Buckendale application, but in the Buckendale application, that is the extent of the adjustment. With our added features a major adjustment can now be made to quickly take up a large amount of slack and position the parts for further simple one-handed periodical take-ups. The major adjustment is as follows:

Bolt 32 is turned in the direction opposite that which is required for taking up wear, until the pin 23 is substantially in the initial position (Figure 1). When this has been done cotter pin 61 is removed from clevis pin 42 and the clevis pin is removed from its position. Then arm 38 may be moved so that aperture 40 is brought into alinement with apertures 55 of plates 16, at which time clevis pin 42 is inserted therethrough and positioned against coming out by replacing cotter pin 61.

The angle between apertures 44 and 55 of plate 16 is substantially equal to the angular movement obtained by threading bolt 32 through pin 23 to the maximum adjustment position. Therefore, with the arm 38 in its new position the cam or cam shaft 6 is essentially in the same position relative to the brake shoes as it was before pin 23 was threaded back to its original location. This operation just described is the only time that two-handed adjustment is necessary. Now, the mechanism is ready for repetition of small periodical one-handed adjustments by means of the head of adjusting bolt 32, and when such adjustment is completed the mechanism will be in the position shown in Figure 4.

It will readily be seen that the described mechanism has the advantage of affording double the adjustment that normally can be obtained with similar devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a slack adjuster of the angularly adjustable type, comprising a shaft, an operating member adapted to freely rotate about said shaft, a second member mounted for rotation with said shaft, means for operatively interconnecting said members comprising means whereby small angular adjustments may be made throughout a limited angular range and means adapted to alter the angular relation between said means for making small angular adjustments and said second member whereby the full range of angular adjustment permitted by said first-mentioned adjusting means may be again made available for use.

2. A slack adjuster comprising a shaft, a lever secured to said shaft and adapted to rotate therewith, a pair of spaced members carried by said shaft at opposite sides of said lever, means for adjustably interconnecting said members and said lever, an operating member freely mounted upon said shaft and means for adjustably interconnecting said operative member and said spaced members.

3. A slack adjuster comprising a shaft provided with a reduced end portion and an annular groove of a diameter equal to the diameter of said reduced portion, a serrated portion separating said reduced portion from said groove and being of a diameter equal to the unreduced diameter of said shaft, a lever secured to said serrated portion and thereby adapted to rotate with said shaft, a pair of operable freely rotatable members one of which is retained in said groove and the other of which fits upon said reduced portion, and means interconnecting said freely rotatable members and said lever for unitary angular movement.

4. A slack adjuster comprising a shaft provided with a reduced end portion and an annular groove of a diameter equal to the diameter of said reduced portion, a serrated portion separating said reduced portion from said groove and being of a diameter equal to the unreduced diameter of said shaft, a lever secured to said serrated portion and thereby adapted to rotate with said shaft, a pair of operable freely rotatable members one of which is retained in said groove and the other of which fits upon said reduced portion, a bifurcated operating member having legs apertured to a diameter equal to the unreduced diameter of said shaft, one of said leg apertures fitting the shaft adjacent said groove and the other loosely surrounding said reduced portion, and a bushing adapted to fill the space between said other aperture and said reduced portion of the shaft, whereby the slack adjuster may be used either as a left hand or right hand unit employing identical parts.

5. In a wear compensating or slack adjusting mechanism, a shaft, a groove in said shaft, an operating member carried by said shaft, a lever secured to said shaft, a plate provided with a slot adapted to fit said groove, adjustable means interconnecting said operating member and said plate, means interconnecting said lever and said plate, said plate adapted to be associated with said groove by a motion in a plane normal to the axis of said shaft, whereby the plate, after being connected to said lever and said operating member, prevents axial movement of the mechanism along said shaft.

6. In a slack adjuster, a shaft; a groove formed upon said shaft; a continuously serrated portion on said shaft; a lever comprising an annular collar, said collar being split to form a pair of ears; a bolt spaced from said shaft and adapted to be freely received in one of said ears and screwed into the other of said ears whereby the lever is secured to said serrated portion to obtain rotation of said shaft; an operating member carried by said shaft; and means adapted to fit said groove and connected to said lever and said operating member whereby axial movement of the assembly is prevented relative to the shaft.

7. In a slack adjuster, a shaft, an operating member freely mounted on said shaft, a lever secured to said shaft, a plate provided with a plurality of angularly spaced apertures and freely mounted on said shaft, means interconnecting said plate and said operating member, and means designed for cooperation with any one of said apertures for interconnecting said plate and said lever whereby selective angular positioning of said plate and said operating member and said plate and said lever respectively may be obtained.

8. In a slack adjusting mechanism, a shaft, a member fixed to said shaft, a second member rotatably carried by said shaft, multiple coupling means between said members to vary the angular relationship therebetween, said multiple coupling means including means for making continuous minor adjustments and further including means for quickly making a major adjustment between said fixed and rotatable members.

9. A mechanism of the character described comprising a shaft, a member positively connected to said shaft, a plurality of members freely mounted on said shaft, means adjustably interconnecting said freely mounted members in predetermined angular relation, and means connecting one of said freely mounted members to said positively connected member, the last named means including an angular adjustment that is offset laterally with respect to said shaft.

HERBERT W. ALDEN.
LAURENCE R. BUCKENDALE.